(12) United States Patent
Cai et al.

(10) Patent No.: US 9,094,828 B2
(45) Date of Patent: Jul. 28, 2015

(54) MACHINE TYPE COMMUNICATIONS (MTC) IN NETWORKS USING NON ACCESS STRATUM (NAS) SIGNALING

(75) Inventors: Yigang Cai, Naperville, IL (US); Suzann Hua, Lisle, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 90 days.

(21) Appl. No.: 13/408,772

(22) Filed: Feb. 29, 2012

(65) Prior Publication Data

US 2013/0227138 A1 Aug. 29, 2013

(51) Int. Cl.
*G06F 15/173* (2006.01)
*H04W 12/08* (2009.01)
*H04L 29/06* (2006.01)
*H04W 4/00* (2009.01)

(52) U.S. Cl.
CPC .......... *H04W 12/08* (2013.01); *H04L 63/0227* (2013.01); *H04L 63/107* (2013.01); *H04L 63/108* (2013.01); *H04W 4/005* (2013.01)

(58) Field of Classification Search
CPC ............................ H04W 48/04; H04W 4/0005
USPC ........................................... 709/225; 370/328
See application file for complete search history.

(56) References Cited

U.S. PATENT DOCUMENTS

| | | | | |
|---|---|---|---|---|
| 8,200,830 B2* | 6/2012 | Ramankutty et al. | ......... | 709/227 |
| 8,321,565 B2* | 11/2012 | Bao et al. | ............ | 709/225 |
| 8,335,197 B2* | 12/2012 | Jeong et al. | ............ | 370/338 |
| 2010/0057485 A1* | 3/2010 | Luft | .................... | 705/1 |
| 2011/0106946 A1* | 5/2011 | Bao et al. | ............. | 709/225 |
| 2011/0116382 A1* | 5/2011 | McCann et al. | ............. | 370/241 |
| 2011/0201343 A1* | 8/2011 | Pinheiro et al. | ............. | 455/450 |
| 2011/0310731 A1* | 12/2011 | Park et al. | ............ | 370/230 |
| 2012/0039171 A1* | 2/2012 | Yamada et al. | ............. | 370/232 |
| 2012/0207015 A1* | 8/2012 | Marsico | ................ | 370/221 |
| 2012/0264451 A1* | 10/2012 | Kim et al. | ............. | 455/456.1 |
| 2013/0051231 A1* | 2/2013 | Cai et al. | ............. | 370/230 |
| 2013/0155954 A1* | 6/2013 | Wang et al. | ............. | 370/328 |
| 2013/0336305 A1* | 12/2013 | Yan et al. | ............. | 370/338 |

FOREIGN PATENT DOCUMENTS

| | | |
|---|---|---|
| WO | WO2011065718 A2 | 6/2011 |
| WO | WO2011117842 A1 | 9/2011 |

\* cited by examiner

*Primary Examiner* — Kevin Bates
*Assistant Examiner* — Clarence D McCray
(74) *Attorney, Agent, or Firm* — Duft, Bornsen & Fettig, LLP

(57) ABSTRACT

Systems and methods that send Machine Type Communications (MTC) using Non Access Stratus (NAS) signaling. In one embodiment, a network element receives NAS signaling that includes MTC data from a device. The network element identifies an MTC profile associated with the device that includes parameters defining what MTC data transmissions are allowed for the device through NAS signaling. The network element then determines whether transmission of the MTC data is allowed by the device based on the MTC profile. If the transmission of the MTC data is allowed, then the network element sends the MTC data to another MTC entity, such as another MTC device or an MTC server. If not, then the network element rejects the transmission of the MTC data.

20 Claims, 4 Drawing Sheets

US 9,094,828 B2

MACHINE TYPE COMMUNICATIONS (MTC) IN NETWORKS USING NON ACCESS STRATUM (NAS) SIGNALING

FIELD OF THE INVENTION

The invention is related to the field of communication systems and, in particular, to Machine Type Communications (MTC).

BACKGROUND

Machine Type Communications (MTC) or Machine-to-Machine (M2M) communications refers to technologies that allow devices to communicate with no or little human intervention. MTC devices store data, and transmit the data to other MTC devices or an MTC server over a network, such as a cellular network. For example, an MTC device may be attached to a gas or electric meter, and the MTC device periodically (e.g., weekly, monthly, etc.) transmits a meter reading to an MTC server, such as at the utility company.

The amount of data exchanged between MTC devices is typically very small, such as less than a few bytes. Because MTC devices send or receive only small amounts of data, the exchanges of data are considered "small data transmissions". The amount that is considered "small" may depend on individual network operators.

MTC continue to increase over core networks. Thus, efficient use of network resources to provide MTC is important to network operators.

SUMMARY

Embodiments described herein provide for improved Machine Type Communications (MTC) over communication networks. Typically, when User Equipment (UE) registers with a communication network (such as a Long Term Evolution (LTE) network), the UE is authenticated and a Packet Data Network (PDN) connection is established between the UE and the core of the network. If a device were to send MTC data over the network, the device would send the MTC data over the PDN connection. However, MTC data is usually so small (i.e., just a few bytes) that it is a waste of network resources to send the MTC data over a PDN connection.

The systems described herein allow a device to send a small data transmission over a network using Non Access Stratum (NAS) signaling. NAS protocol is a signaling protocol used between a UE and a network element, such as a mobility management entity. In an LTE network, NAS signaling is typically used for mobility management, and for support of session management between a UE and a Packet Data Network (PDN) gateway. In the embodiments described herein, NAS signaling is used to carry MTC data transmissions. In other words, the small data transmissions for MTC are encapsulated in NAS signaling messages and sent over the network. This is advantageous because a PDN connection does not need to be established or used in order for a UE to send MTC data over the network. Therefore, network resources do not need to be wasted in transporting MTC data over a PDN connection. Due to the small size of MTC data, NAS signaling can be used to transport the MTC data. This can save network resources especially when there is significant MTC traffic, such as during peak times.

One embodiment comprises an element of a communication network. The network element is configured to receive NAS signaling that includes MTC data from a device. The network element is further configured to identify an MTC profile associated with the device that includes parameters defining what MTC data transmissions are allowed for the device through NAS signaling. The network element is further configured to determine whether transmission of the MTC data is allowed by the device based on the MTC profile. If the transmission of the MTC data is allowed, then the network element is further configured to send the MTC data to another MTC entity, such as another MTC device or an MTC server. If the transmission of the MTC data is not allowed, then the network element is further configured to reject the transmission of the MTC data to the other MTC entity.

In another embodiment, the network element is configured to identify an authorization parameter in the MTC profile that defines whether the device is authorized to send MTC data using NAS signaling, and to determine that the transmission of the MTC data is not allowed if the device is not authorized.

In another embodiment, the network element is configured to identify a size parameter in the MTC profile that defines a size allowed for MTC data transmissions, to compare the size of the MTC data to the size parameter, and to determine that the transmission of the MTC data is not allowed if the size of the MTC data exceeds the size parameter.

In another embodiment, the network element is configured to identify a time parameter in the MTC profile that defines a time range allowed for MTC data transmissions, to compare the time of the transmission of the MTC data to the time parameter, and to determine that the transmission of the MTC data is not allowed if the time of the transmission is outside of the time range defined in the time parameter.

In another embodiment, the network element is configured to identify a location parameter in the MTC profile that defines at least one location where the device is allowed to perform MTC data transmissions, to compare a location of the device to the location parameter, and to determine that the transmission of the MTC data is not allowed if the location of the device fails to comply with the location parameter.

In another embodiment, the network element does not have a bearer connection established with the device through the communication network. If the transmission of the MTC data in NAS signaling is not allowed, then the network element is configured to notify the device that the transmission was rejected, to establish a bearer connection with the device, and to receive the MTC data from the device over the bearer connection.

In another embodiment, the network element comprises a Mobility Management Entity (MME) of a Long Term Evolution (LTE) network. The MME is configured to receive the MTC profile from a Home Subscriber Server (HSS) in, for example, a Diameter Update-Location-Answer (ULA), and to store the MTC profile for the device. The MME is also configured to receive updated profile information for the MTC profile from the HSS in, for example, a Diameter Insert-Subscriber-Data-Request (IDR), and to update the MTC profile being stored for the device based on the updated profile information.

In another embodiment, the MTC data may be carried in Packet Data Units (PDUs) in the NAS signaling. Thus, the MME is configured to convert the NAS PDUs to PDUs of an appropriate protocol, and send the PDUs to other network elements directly in the LTE network but bypassing a PDN connection. The other LTE network elements may include an MTC server, a Short Message Server (SMS) center, an SMS Gateway, an SMS router, an IWMSC, etc.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
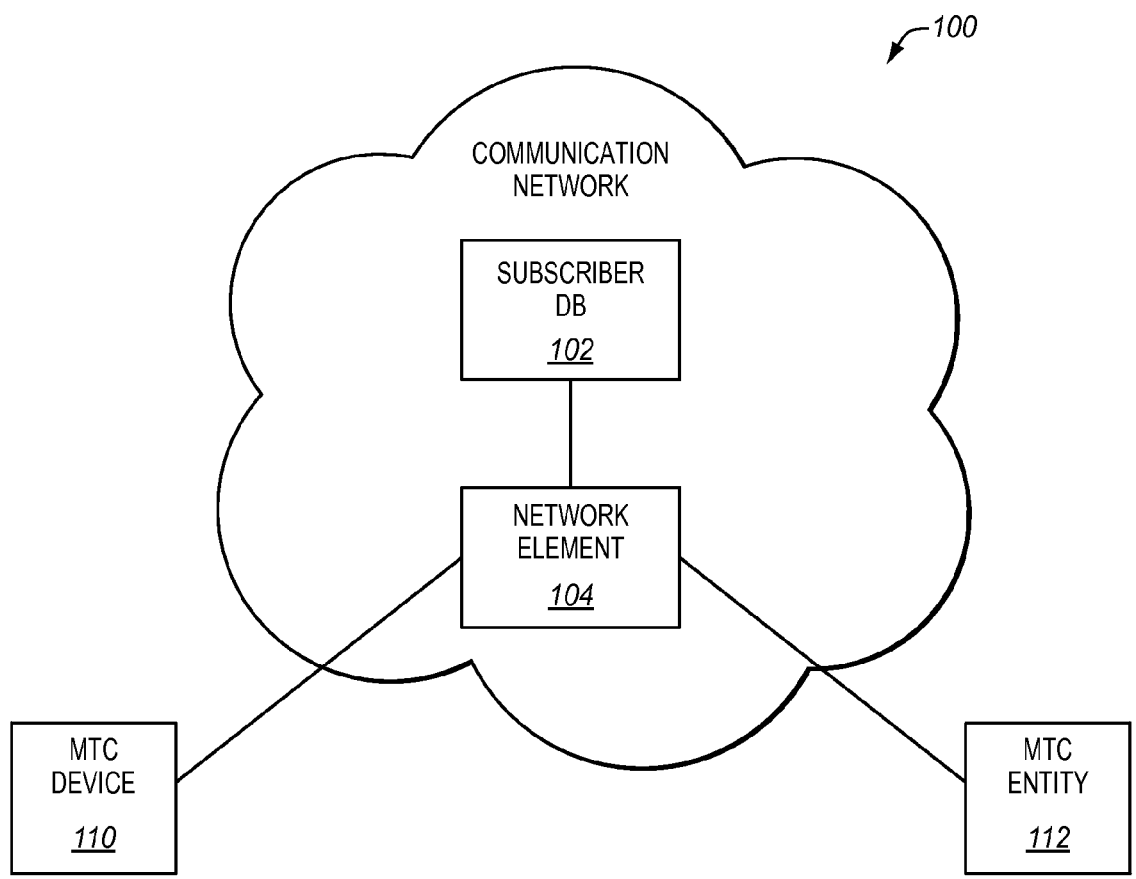
FIG. 1 illustrates a communication network in an exemplary embodiment.

FIG. 1 illustrates a communication network 100 in an exemplary embodiment. The embodiments described below allow for Machine Type Communication (MTC) data to be transmitted over network 100 in an efficient manner. Network 100 comprises a core network that provides communication service to mobile devices. One example of network 100 is a Long Term Evolution (LTE) network. FIG. 1 illustrates network 100 being connected to an MTC device 110 and an MTC entity 112. An MTC device 110 comprises a UE equipped for MTC and is able to communicate over a network to an MTC entity. Device 110 may be LTE-enabled in these embodiments so that it may communicate with an LTE network. Device 110 may be a wireless device, so a Radio Access Network (RAN) may be implemented between device 110 and the core of network 100. MTC entity 112 comprises any system, server, or device that is able to receive MTC data from device 110. MTC entity 112 may represent an MTC server or another MTC device.

Network 100 includes a subscriber database (DB) 102 and one or more network elements 104. Subscriber database 102 comprises any system that stores subscription-related information for end users or devices, which are also referred to as subscriber profiles. Subscriber database 102 may be thought of as a master database, such as a Home Subscriber Server (HSS), that stores subscriber profiles, performs authentication and authorization of end users, provides information about a subscriber's location, etc. Network element 104 comprises any node within a core network that is able to receive MTC data from a device. For example, network element 104 may comprise a Mobility Management Entity (MME), a Packet Data Network Gateway (PDN-GW), etc., of an LTE network. Although only one network element is shown in FIG. 1, network 100 may include multiple network elements.

In this embodiment, subscriber database 102 stores a subscriber profile that is associated with device 110. The subscriber profile also includes a profile for Machine Type Communications (MTC). The MTC profile includes parameters that define what MTC data transmissions are allowed for device 110 through NAS signaling. The MTC profile may include the following parameters:

An Authorization parameter indicating whether MTC data transmissions are allowed for this device (e.g., a value yes or no).

A Size parameter, which may be an integer value indicating a number of bytes allowed for an MTC data transmission, or two integer values indicating a byte range allowed for an MTC data transmission.

A Time parameter, which may be two timestamp values indicating a start time and an end time when MTC data transmissions are allowed. Alternatively, a single timestamp may indicate a time before or after which a MTC data transmission is allowed.

A Location parameter indicating a location from which MTC data transmissions are allowed. For example, the location parameter may be two values indicating a geographic longitude and latitude where MTC data transmissions are allowed.

Subscriber database 102 stores the MTC profile and is able to provide the MTC profile to network element 104 or other network elements (not shown) upon request.

When in operation, device 110 collects MTC data and initiates a transmission of the MTC data over network 100 to MTC entity 112. The amount of MTC data in the transmission is typically very small. For example, device 110 may be connected to a gas meter, and may be configured to report a meter reading periodically to MTC entity 112. Therefore, a data transmission initiated by device 110 may comprise a device ID and a meter reading. To send the MTC data, device 110 encapsulates the data in Non-Access Stratum (NAS) signaling (in an appropriate signaling message of NAS protocol), and transmits the NAS signaling toward network 100. Transmission of MTC data will then be managed in network 100 as illustrated in FIG. 2.

Figure 2:
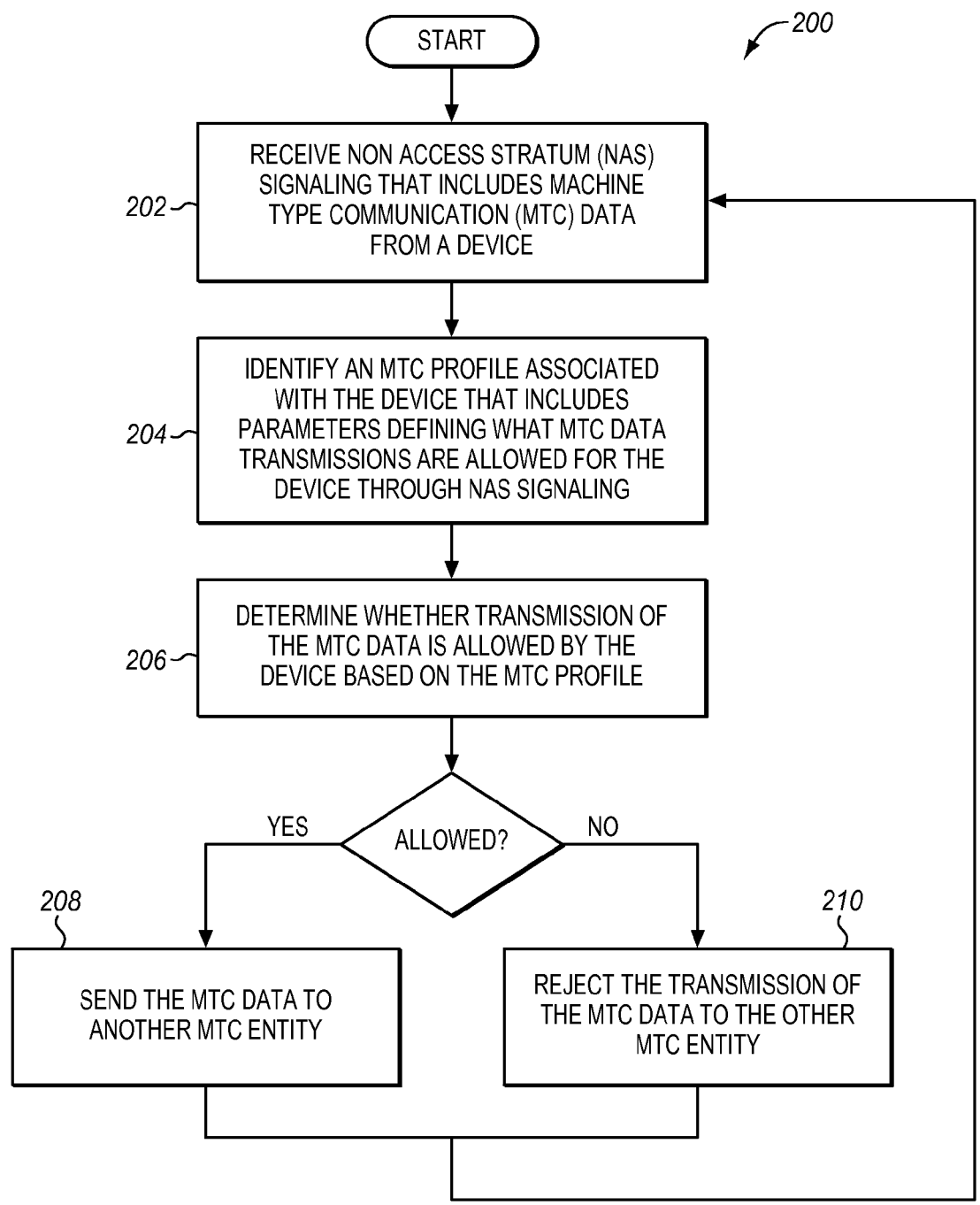
FIG. 2 is a flow chart illustrating a method of managing MTC data transmissions in an exemplary embodiment.

FIG. 2 is a flow chart illustrating a method 200 of managing MTC data transmissions in an exemplary embodiment. The steps of method 200 will be described with reference to network 100 in FIG. 1, but those skilled in the art will appreciate that method 200 may be performed in other networks and systems. The steps of the flow charts described herein are not all inclusive and may include other steps not shown. The steps may also be performed in an alternative order.

In step 202, network element 104 receives the NAS signaling that includes the MTC data from device 110. In step 204, network element 104 identifies an MTC profile associated with device 110. As described above, subscriber database 102 stores an MTC profile for device 110 that includes parameters which define what MTC data transmissions are allowed for device 110. Therefore, network element 104 retrieves and stores the MTC profile for device 110 at some point. Network element 104 may retrieve the MTC profile if/when MTC device 110 attaches to network 100. If MTC device 110 does not attach to network 100, then network element 104 may retrieve the MTC profile from subscriber database 102 upon receiving the data transmission.

In step 206, network element 104 determines whether transmission of the MTC data is allowed by device 110 based the MTC profile. Network element 104 processes one or more parameters in the MTC profile to determine whether the MTC data transmission is allowed. In one example, network element 104 may identify an authorize parameter in the MTC profile that defines whether the device is authorized to send MTC data using NAS signaling, and determine that the transmission of the MTC data is not allowed if device 110 is not authorized. In another example, network element 104 may identify a size parameter in the MTC profile that defines a size allowed for MTC data transmissions, and compare the size of the MTC data to the size parameter. If the size of the MTC data exceeds the size parameter, then network element 104 determines that the transmission of MTC data is not allowed. In another example, network element 104 may identify a time parameter in the MTC profile that defines a time range allowed for MTC data transmissions, and compare the time of the transmission to the time parameter. If the time of the MTC data transmission is outside of the time range defined in the time parameter, then network element 104 may determine that the transmission of the MTC data is not allowed. In another example, network element 104 may identify a location parameter in the MTC profile that defines one or more locations where MTC data transmissions are allowed, and compare a location of device 110 to the location parameter. If the location of device 110 fails to comply with the location parameter, then network element 110 may determine that the transmission is not allowed.

If the transmission of MTC data is allowed, then network element 104 sends the MTC data to MTC entity 112 in step 208. Network element 104 may send the MTC data using any desired protocol, which may not be NAS protocol. There may also be an interworking element between network element 104 and MTC entity 112 that converts between protocols used in network element 104 and MTC entity 112, which is not shown in FIG. 1.

If the transmission of MTC data is not allowed, then network element 104 rejects the transmission of the MTC data in step 210. If the data transmission is rejected, then network element 104 may also send a notification to device 110 using NAS signaling.

In the embodiment described above, device 110 may be attached to network 100 with or without a bearer connection established. For example, a device may attach to an LTE network and establish a Packet Data Network (PDN) connection (i.e., a bearer connection) during registration. However, there may be times when a device attaches to an LTE network but does not establish a PDN connection. Regardless of whether device 110 has established a bearer connection with network 100, device 110 is able to send MTC data to network 100 using NAS signaling. In another embodiment, if the transmission of MTC data is rejected based on the MTC profile (as in step 210), then device 110 may send the MTC data to network 100 using a bearer connection. To initiate this, network element 104 may send a notification to device 110 (in NAS protocol) indicating that the MTC data transmission is/was rejected. If device 110 has an established bearer connection, then device 110 may send the MTC data to network element 104 over the bearer connection. If device 110 does not have a bearer connection established, then device 110 may establish a bearer connection and then send the MTC data to network element 104 over the bearer connection.

One particular instance of sending the MTC data over a bearer connection may occur if the MTC data is too large for NAS signaling. As described above, the MTC profile for device 110 may include a parameter defining a size of MTC data allowed for transmission (using NAS signaling). If the size of the MTC data exceeds the size parameter, then device 110 may send the MTC data over a bearer connection instead, which does not have similar size restraints. Device 110 may also determine to send MTC data on a bearer connection based on its knowledge of its profile. For example, a device will attempt to send MTC data via NAS signaling when the MTC data to be transmitted is below a threshold size.

By sending MTC data to a network 100 using NAS signaling, network resources do not need to be wasted in transporting the MTC data. Because MTC data is typically small, the MTC data can be sent efficiently using NAS signaling. And, a device does not need to have a bearer connection established with the network in order to send MTC data to the network. This makes transmission of MTC data for efficient over networks, such as an LTE network.

EXAMPLE

Figure 3:
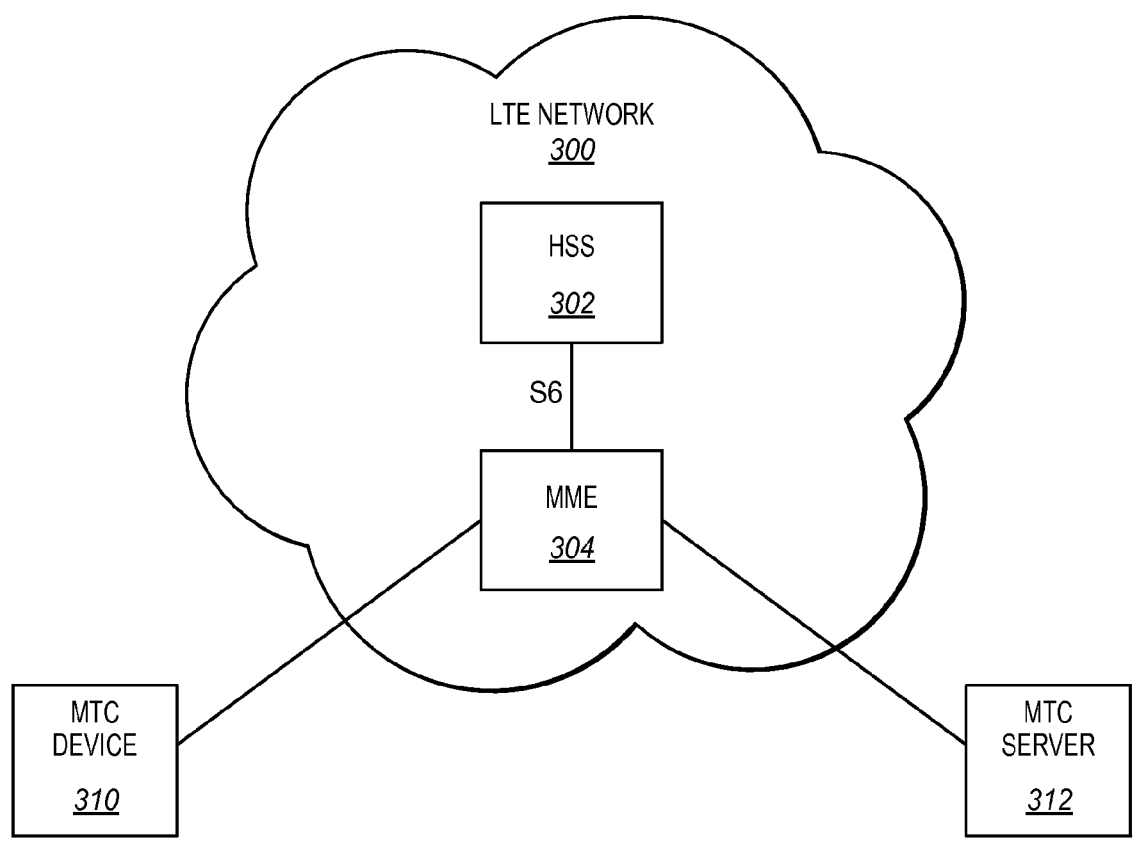
FIG. 3 illustrates an LTE network in another exemplary embodiment.
Figure 4:
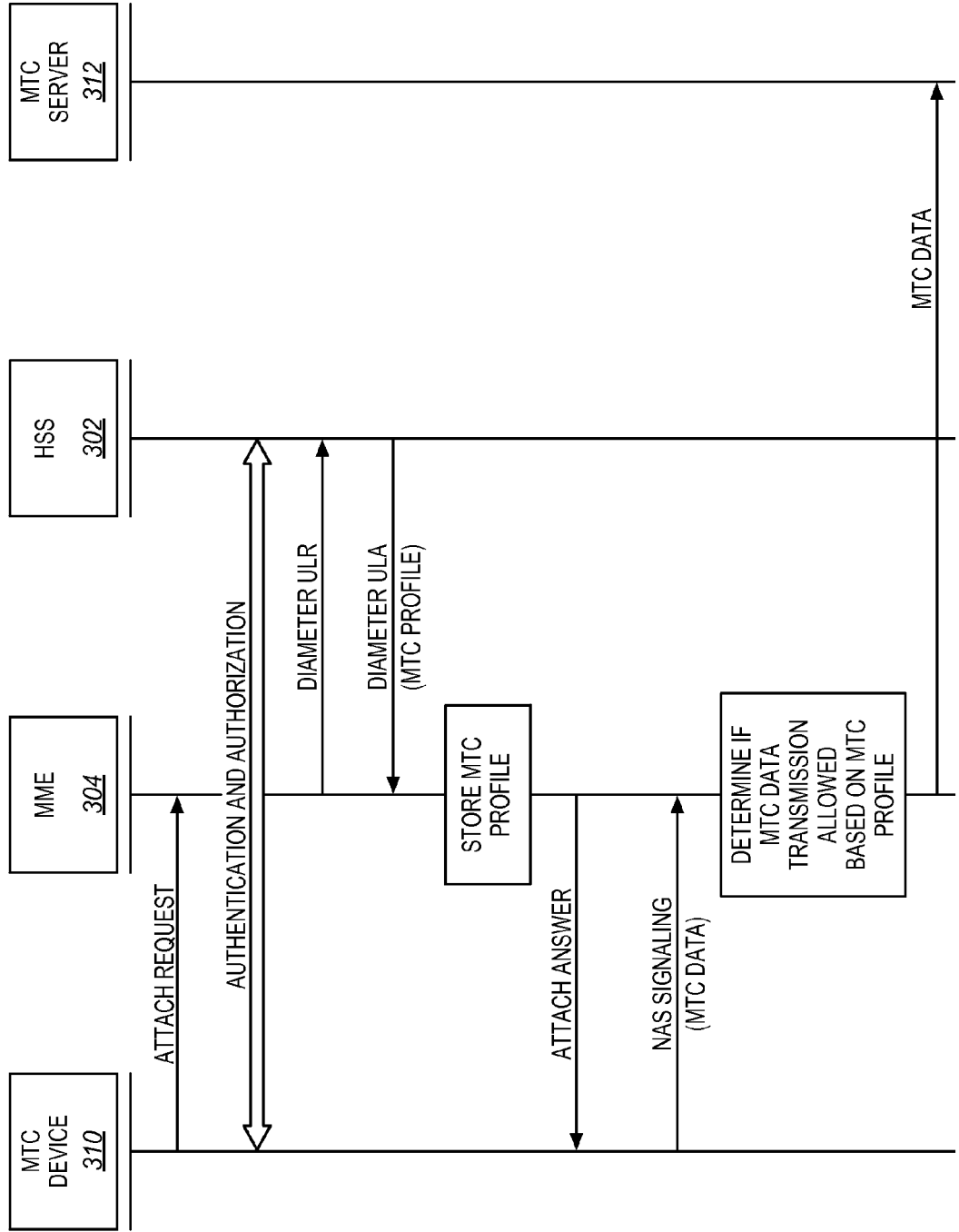
FIG. 4 is a message diagram illustrating MTC data transmissions over an LTE network in an exemplary embodiment.

FIGS. 3-4 illustrate an example of sending MTC data over an LTE network. FIG. 3 illustrates an LTE network 300 in an exemplary embodiment. In this embodiment, LTE network 300 includes a Home Subscriber Server (HSS) 302 and a Mobility Management Entity (MME) 304. HSS 302 stores subscription-related information for MTC device 310 and other devices that access LTE network 300. The subscription-related information for device 310 includes a subscriber profile that indicates services that device 310 may access (if any). In this example, the subscriber profile for device 310 includes a new MTC profile as described herein. The new MTC profile includes parameters that define what MTC data transmissions are allowed for device 310.

MME 304 is responsible for tracking the location of UEs in LTE network 300, among other functionalities. One such functionality is to handle MTC data that is submitted by device 310 or other devices. MME 304 has a NAS interface so that it is able to receive NAS signaling from device 310.

Device 310 may be an LTE-enabled device that is able to access services from LTE network 300, such as voice, data, etc., in addition to sending MTC data. Alternatively, device 310 may only support MTC data transmissions and cannot attach to LTE network 300 for any other purpose than to exchange NAS signaling.

In this embodiment, device 310 is allowed to attach to LTE network 300 without a PDN connection. This means that initially, device 310 will attach to LTE network 300 through NAS signaling only. Thus, device 310 will transmit MTC data (e.g., small data transmission) using NAS signaling.

FIG. 4 is a message diagram illustrating MTC data transmissions over LTE network 300 in an exemplary embodiment. To start, device 310 sends an attach request to MME 304 to attach to LTE network 300. The attach request is in NAS protocol. LTE network 300 then attempts to authenticate and authorize device 310. The attach request also triggers an update location procedure, for example, on the S6a Diameter interface, between MME 304 and HSS 302. Therefore, MME 304 sends an update location request, for example an S6a Diameter Update-Location-Request (ULR), to HSS 302. HSS 302 identifies the MTC profile associated with device 310 in response to the ULR, and sends an update location answer, for example an S6a Update-Location-Answer (ULA), to MME 304 with the MTC profile. MME 304 then stores the MTC profile for device 310 for as long as device 310 is registered with LTE network 300. MME 304 also provides an attach answer to device 310 after it is registered. Although device 310 is attached to LTE network 300, it is attached without a PDN connection. In other words, device 310 is allowed to register with LTE network 300 (so that MME 304 has the MTC profile for device 310), but no bearer connection is established between LTE network 300 and device 310.

After attaching to LTE network 300, device 310 collects data (referred to as MTC data) for transmission to MTC server 312 (as illustrated in FIG. 3). For example, assume that device 310 is connected to a gas meter and collects a reading from the gas meter. To send the MTC data in this example, device 310 inserts the MTC data into NAS signaling and sends the NAS signaling to MME 304. In response to receiving the NAS signaling, MME 304 identifies the MTC profile that it has stored for device 310, and determines whether transmission of the MTC data is allowed by device 310. To do so, MME 304 determines whether one or more parameters of the MTC profile are satisfied by the MTC data transmission, such as size of the data, location of device 310, time of day, etc. If the MTC data transmission passes the test of each of the parameters in the MTC profile, then MME 304 sends the MTC data to MTC server 312 (as illustrated in FIG. 4). MME 304 may convert Packet Data Units (PDUs) from the NAS signaling (which carry the MTC data) into PDUs in an appropriate protocol used by MTC server 312, and send the PDUs to MTC server 312 directly by bypassing a PDN connection.

If the data transmission fails one or more of the tests defined by the parameters, then MME 304 rejects the data transmission. MME 304 may optionally allow device 310 to establish a normal PDN connection to send the MTC data if the transmission fails using NAS protocol. For example, if the amount of data exceeds the size parameter in the MTC profile, then MME 304 may notify device 310 so that device 310 can establish a PDN connection with LTE network 300 and send the MTC data over the PDN connection.

If the MTC profile would happen to change in HSS 302, then HSS 302 is able to notify MME 304 of the update to the MTC profile. To do so, HSS 302 sends an update profile request, for example an S6a Diameter Insert-Subscriber-Data-Request (IDR), to MME 304 with the updated profile information. MME 304 receives the update profile request (e.g., IDR), and updates the MTC profile being stored for device 310 based on the updated profile information.

Any of the various elements shown in the figures or described herein may be implemented as hardware, software in combination with hardware, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A network element for a communication network, the network element comprising a processor and an associated memory;
the network element configured to retrieve a profile for a device when the device attaches to the communication network, wherein the profile includes at least one parameter defining what Machine Type Communication (MTC) data transmissions are allowed for the device through Non Access Stratum (NAS) signaling;
the network element further configured to receive NAS signaling that encapsulates MTC data from the device after the device attaches to the communication network;
the network element further configured to process the at least one parameter of the profile for the device to determine whether transmission of the MTC data using NAS signaling is allowed by the device;
the network element further configured to send the MTC data to another MTC entity when the transmission of the MTC data is allowed;
the network element further configured to reject the transmission of the MTC data to the another MTC entity when the transmission of the MTC data is not allowed, and to send a notification to the device to transmit the MTC data over a bearer connection.

2. The network element of claim 1 wherein:
the network element is further configured to identify an authorization parameter in the profile that defines whether the device is authorized to send MTC data using NAS signaling, and to determine that the transmission of the MTC data is not allowed if the device is not authorized.

3. The network element of claim 1 wherein:
the network element is further configured to identify a size parameter in the profile that defines a size allowed for MTC data transmissions using NAS signaling, to compare the size of the MTC data to the size parameter, and to determine that the transmission of the MTC data is not allowed using NAS signaling if the size of the MTC data exceeds the size parameter.

4. The network element of claim 1 wherein:
the network element is further configured to identify a time parameter in the profile that defines a time range allowed for MTC data transmissions using NAS signaling, to compare the time of the transmission of the MTC data to the time parameter, and to determine that the transmission of the MTC data is not allowed using NAS signaling if the time of the transmission is outside of the time range defined in the time parameter.

5. The network element of claim 1 wherein:
the network element is further configured to identify a location parameter in the profile that defines at least one location where the device is allowed to perform MTC data transmissions using NAS signaling, to compare a location of the device to the location parameter, and to determine that the transmission of the MTC data is not allowed using NAS signaling if the location of the device fails to comply with the location parameter.

6. The network element of claim 1 wherein:
when the transmission of the MTC data is not allowed using NAS signaling:
the network element is further configured to establish the bearer connection with the device, and to receive the MTC data from the device over the bearer connection instead of using NAS signaling.

7. The network element of claim 1 wherein:
the network element comprises a Mobility Management Entity (MME) for a Long Term Evolution (LTE) network.

8. The network element of claim 7 wherein:
the MME is configured to receive the profile in a Diameter Update-Location-Answer (ULA) from a Home Subscriber Server (HSS), and to store the profile for the device.

9. The network element of claim 8 wherein:
the MME is further configured to receive updated profile information for the profile in a Diameter Insert-Subscriber-Data-Request (IDR) from the HSS, and to update the profile being stored for the device based on the updated profile information.

10. A method comprising:
retrieving, in a network element of a communication network, a profile for a device when the device attaches to the communication network, wherein the profile includes at least one parameter defining what Machine Type Communication (MTC) data transmissions are allowed for the device through Non Access Stratum (NAS) signaling;
receiving, in the network element of the communication network, NAS signaling that encapsulates MTC data from the device after the device attaches to the communication network;
processing the at least one parameter of the profile for the device to determine whether transmission of the MTC data using NAS signaling is allowed by the device;
if the transmission of the MTC data is allowed, then sending the MTC data to another MTC entity; and
if the transmission of the MTC data is not allowed, then rejecting the transmission of the MTC data to the another MTC entity, and sending a notification to the device to transmit the MTC data over a bearer connection.

11. The method of claim 10 wherein processing the at least one parameter of the profile for the device to determine whether transmission of the MTC data is allowed comprises:
identifying an authorization parameter in the profile that defines whether the device is authorized to send MTC data using NAS signaling; and
determining that the transmission of the MTC data is not allowed if the device is not authorized.

12. The method of claim 10 wherein processing the at least one parameter of the profile for the device to determine whether transmission of the MTC data is allowed comprises:
identifying a size parameter in the profile that defines a size allowed for MTC data transmissions using NAS signaling;
comparing the size of the MTC data to the size parameter; and
determining that the transmission of the MTC data is not allowed using NAS signaling if the size of the MTC data exceeds the size parameter.

13. The method of claim 10 wherein processing the at least one parameter of the profile for the device to determine whether transmission of the MTC data is allowed comprises:
identifying a time parameter in the profile that defines a time range allowed for MTC data transmissions using NAS signaling;
comparing the time of the transmission of the MTC data to the time range; and
determining that the transmission of the MTC data is not allowed using NAS signaling if the time of the transmission is outside of the time range defined in the time parameter.

14. The method of claim 10 wherein processing the at least one parameter of the profile for the device to determine whether transmission of the MTC data is allowed comprises:
identifying a location parameter in the profile that defines at least one location where the device is allowed to perform MTC data transmissions using NAS signaling;
comparing a location of the device to the location parameter; and
determining that the transmission of the MTC data is not allowed using NAS signaling if the location of the device fails to comply with the location parameter.

15. The method of claim 10 wherein:
when the transmission of the MTC data is not allowed using NAS signaling, the method further comprises:
establishing a bearer connection with the device; and
receiving the MTC data from the device over the bearer connection instead of using NAS signaling.

16. The method of claim 10 wherein:
the network element comprises a Mobility Management Entity (MME) of a Long Term Evolution (LTE) network; and
the method further comprises:
receiving the profile into the MME from a Home Subscriber Server (HSS) in a Diameter Update-Location-Answer (ULA); and
storing the profile for the device in the MME.

17. The method of claim 16 further comprising:
receiving updated profile information for the profile into the MME from the HSS in a Diameter Insert-Subscriber-Data-Request (IDR); and
updating the profile being stored for the device based on the updated profile information.

18. A system comprising:
a Mobility Management Entity (MME) of a Long Term Evolution (LTE) network;
the MME configured to receive an attach request from a device to attach to the LTE network, and to transmit a Diameter Update-Location-Request (ULR) to a Home Subscriber Server (HSS);
the MME configured to receive a Diameter Update-Location-Answer (ULA) from the HSS that includes a profile for a device, and to store the profile;
wherein the profile includes parameters defining what Machine Type Communication (MTC) data transmissions are allowed for the device using Non Access Stratum (NAS) signaling;
the MME is further configured to receive NAS signaling that encapsulates MTC data from the device after the device attaches to the LTE network, and to process the at least one parameter of the profile for the device to determine whether transmission of the MTC data is allowed by the device;
the MME is further configured to send the MTC data to another MTC entity when the transmission of the MTC data is allowed;
the MME is further configured to reject the transmission of the MTC data to the another MTC entity when the transmission of the MTC data is not allowed, and to send a notification to the device to transmit the MTC data over a bearer connection.

19. The system of claim 18 wherein:
the MME is further configured to receive updated profile information for the profile from the HSS in a Diameter Insert-Subscriber-Data-Request (IDR), and to update the profile being stored for the MTC device based on the updated profile information.

20. The system of claim 18 wherein:
if the transmission of the MTC data is not allowed, then the MME is further configured to establish a Packet Data Network (PDN) connection with the device when the MME does not have a prior PDN connection established with the device, and to receive the MTC data from the device over the PDN connection instead of using NAS signaling.

* * * * *